US012706015B2

United States Patent

(12) United States Patent
Lee et al.

(10) Patent No.: US 12,706,015 B2
(45) Date of Patent: Aug. 11, 2026

(54) DISPLAY MODULE, DISPLAY DEVICE INCLUDING THE SAME, AND METHOD OF OPERATING THE SAME

(71) Applicant: Samsung Display Co., Ltd., Yongin-si (KR)

(72) Inventors: Won Hee Lee, Yongin-si (KR); Sang Jin Pak, Yongin-si (KR); Hyun Seuk Yoo, Yongin-si (KR); Myung Woo Lee, Yongin-si (KR); Man Seung Cho, Yongin-si (KR)

(73) Assignee: Samsung Display Co., Ltd., Yongin-Si (KR)

( * ) Notice: Subject to any disclaimer, the term of this patent is extended or adjusted under 35 U.S.C. 154(b) by 198 days.

(21) Appl. No.: 18/619,695

(22) Filed: Mar. 28, 2024

(65) Prior Publication Data

US 2025/0006098 A1 Jan. 2, 2025

(30) Foreign Application Priority Data

Jun. 29, 2023 (KR) ........................ 10-2023-0084441

(51) Int. Cl.
*G09G 3/20* (2006.01)

(52) U.S. Cl.
CPC ... *G09G 3/2007* (2013.01); *G09G 2320/0233* (2013.01); *G09G 2320/0686* (2013.01); *G09G 2354/00* (2013.01)

(58) Field of Classification Search
None
See application file for complete search history.

(56) References Cited

U.S. PATENT DOCUMENTS

| | | | | |
|---|---|---|---|---|
| 2015/0034723 A1* | 2/2015 | Watanabe | G11B 7/00455 235/494 |
| 2018/0292896 A1* | 10/2018 | Hicks | G06F 3/013 |
| 2020/0301161 A1* | 9/2020 | Iwata | G06T 7/74 |
| 2022/0197378 A1* | 6/2022 | Song | G02B 27/0172 |

FOREIGN PATENT DOCUMENTS

KR 10-2012523 B1 8/2019

OTHER PUBLICATIONS

Paul Miller, "Nvidia's foveated rendering tricks for VR could improve graphics and immersion", The Verge, Jul. 23, 2016, URL: https://www.theverge.com/2016/7/22/12260430/nvidia-foveated-rendering-vr-graphics-smi-eye-tracking-siggraph.

* cited by examiner

*Primary Examiner* — Yanna Wu
(74) *Attorney, Agent, or Firm* — Innovation Counsel LLP

(57) ABSTRACT

A display module includes: a display panel including a display area for displaying an image; a lens unit disposed on the display area; an image generator for receiving visual sensing data from the outside by sensing an eye of a user, identifying a reference area on the display area, based on parameter data and the visual sensing data, and generating a converted image by adjusting grayscales of a target area adjacent to the reference area in an input image; and a controller for controlling the display panel, based on the converted image. The image generator determines a size of the reference area according to the parameter data.

12 Claims, 16 Drawing Sheets

FIG. 5

PDT

| | |
|---|---|
| IDFR1 | PD1 |
| IDFR2 | PD2 |
| IDFR3 | PD3 |
| ⋮ | ⋮ |
| IDFRn | PDn |

DISPLAY MODULE, DISPLAY DEVICE INCLUDING THE SAME, AND METHOD OF OPERATING THE SAME

CROSS-REFERENCE TO RELATED APPLICATION

The present application claims priority under 35 U.S.C. § 119(a) to Korean patent application No. 10-2023-0084441 filed on, Jun. 29, 2023 in the Korean Intellectual Property Office, the entire disclosure of which is incorporated herein by reference.

BACKGROUND

1. Technical Field

The present disclosure generally relates to a display module, and more particularly, to a display module, a display device including the same, and a method of operating the same.

2. Related Art

A display device includes a display panel and a driver. The display panel may display an image on a display area, corresponding to signals provided from the driver.

Meanwhile, when a user views an image displayed on the display area by using the display device, an area, e.g., a visible area or a recognition area, which is visually recognized (or concentrated) by the user in the display area according to a sight of the user, a viewing angle, or the like may vary for each user or each viewing environment. When the display device displays an image with the same luminance in a visible area and an area except the visible area, unnecessary power consumption may occur in the area except the visible area.

The above information disclosed in this Related Art section is only for enhancement of understanding of the background of the disclosure and therefore it may contain information that does not form the prior art that is already known in this country to a person of ordinary skill in the art.

SUMMARY

Embodiments provide a display module capable of operating with reduced power consumption, a display device including the display module, and a method of operating the display device.

In accordance with an aspect of the present disclosure, there is provided a display module including a display panel, a lens unit, an image generator, and a controller. The display panel includes a display area for displaying an image. The lens unit is disposed on the display area. The image generator is configured to receive visual sensing data from the outside by sensing an eye of a user, identify a reference area on the display area, based on parameter data and the visual sensing data, and generate a converted image by adjusting grayscales of a target area adjacent to the reference area in an input image. The controller is configured to control the display panel, based on the converted image, wherein the image generator is configured to determine a size of the reference area according to the parameter data.

The grayscales of the target area in the converted image may be lower than the grayscales of the target area in the input image.

The image generator may be configured to extract a reference position corresponding to a sight of the eye of the user on the display area according to the visual sensing data, and identify an area adjacent to the reference position as the reference area.

The image generator may include a coordinate generator, an image processor, and a grayscale converter. The coordinate generator is configured to determine a viewpoint coordinate corresponding to a sight of the user on the display area, based on the visual sensing data. The image processor is configured to identify the reference area on the display area, based on the determined viewpoint coordinate and the parameter data, and generate gain map data including gain values corresponding to the grayscales of the target area in the input image, based on the reference area. The grayscale converter is configured to generate the converted image from the input image, based on the gain values corresponding to the grayscales of the target area in the input image.

The display module may further include a storage medium configured to store the parameter data.

The lens unit may allow the image displayed by the display area to pass therethrough such that a brightness of an image expressed by the lens unit is uniformly sensed by the user.

The parameter data may be provided according to a field of view and a pixel per degree of the image expressed by the lens unit.

The parameter data may be provided according to a maximum luminance of the image displayed by the display panel.

The visual sensing data may be generated from each of a first frame and a second frame successive to the first frame. The image generator may generate the converted image corresponding to the first frame, based on the visual sensing data generated in the first frame, and generate the converted image corresponding to the second frame, based on the visual sensing data generated in the second frame.

In accordance with an aspect of the present disclosure, there is provided a display device including a display module, a visual sensor, and an image generator. The display module includes a display panel including a display area for displaying an image and a lens unit disposed on the display area. The visual sensor is configured to generate visual sensing data by sensing an eye of a user. The image generator is configured to identify a reference area on the display area, based on parameter data and the visual sensing data, and generate a converted image by adjusting grayscales of a target area adjacent to the reference area in an input image. The display module controls the display panel, based on the converted image, and the image generator is configured to determine a size of the reference area according to the parameter data.

The grayscales of the target area in the converted image may be lower than the grayscales of the target area in the input image.

The display device may further include a memory device configured to store the parameter data.

In accordance with an aspect of the present disclosure, there is provided a method of controlling a display panel including a lens unit and a display area disposed to overlap with the lens unit. The method includes: generating visual sensing data by sensing an eye of a user; identifying a reference area on the display area, based on parameter data and the visual sensing data, and generating a converted image by adjusting grayscales of a target area adjacent to the reference area in an input image; and controlling the display panel, based on the converted image. A size of the reference area is determined according to the parameter data.

The method may further include: determining a viewpoint coordinate corresponding to a sight of the user on the display area, based on the visual sensing data; identifying the reference area on the display area, based on the determined viewpoint coordinate and the parameter data; generating gain map data including gain values corresponding to the grayscales of the target area in the input image, based on the identified reference area; and generating the converted image from the input image, based on the gain values corresponding to the grayscales of the target area in the input image.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

FIG. 5 is a diagram conceptually illustrating an embodiment of a parameter data table stored in a storage medium shown in FIG. 4.

DETAILED DESCRIPTION

Figure 1:
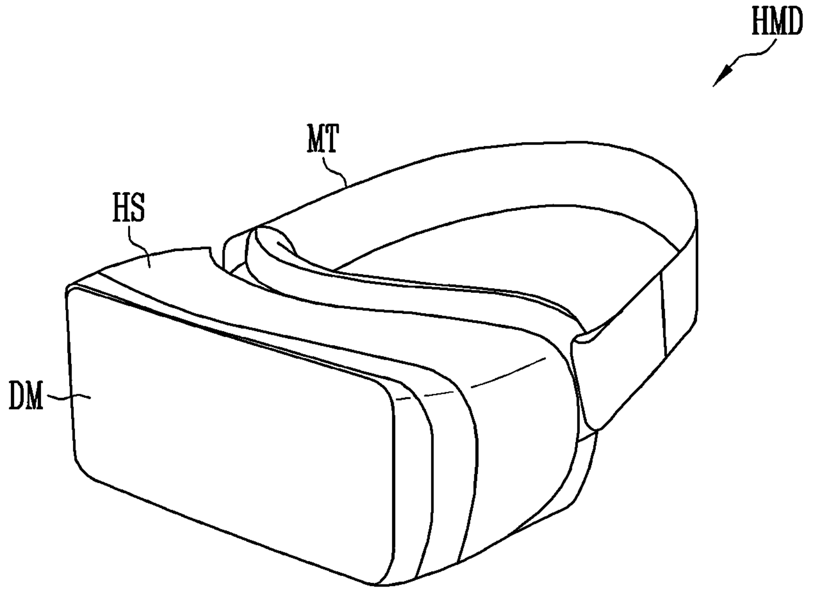
FIG. 1 is a perspective view illustrating an embodiment of a head mounted display device.

Hereinafter, embodiments of the present disclosure will be described in more detail with reference to the accompanying drawings. In the description below, only a necessary part to understand an operation according to the present disclosure is described and the descriptions of other parts are omitted in order not to unnecessarily obscure subject matters of the present disclosure. In addition, the present disclosure is not limited to exemplary embodiments described herein, but may be embodied in various different forms. Rather, exemplary embodiments described herein are provided to thoroughly and completely describe the disclosed contents and to sufficiently transfer the ideas of the disclosure to a person of ordinary skill in the art.

In the entire specification, when an element is referred to as being "connected" or "coupled" to another element, it can be directly connected or coupled to the another element or be indirectly connected or coupled to the another element with one or more intervening elements interposed therebetween. The technical terms used herein are used only for the purpose of illustrating a specific embodiment and not intended to limit the embodiment. It will be understood that when a component "includes" an element, unless there is another opposite description thereto, it should be understood that the component does not exclude another element but may further include another element. It will be understood that for the purposes of this disclosure, "at least one of X, Y, and Z" can be construed as X only, Y only, Z only, or any combination of two or more items X, Y, and Z, e.g., XYZ, XYY, YZ, ZZ. Similarly, for the purposes of this disclosure, "at least one selected from the group consisting of X, Y, and Z" can be construed as X only, Y only, Z only, or any combination of two or more items X, Y, and Z, e.g., XYZ, XYY, YZ, ZZ.

It will be understood that, although the terms "first", "second," etc. may be used herein to describe various elements, these elements should not be limited by these terms. These terms are only used to distinguish one element from another element. Thus, a "first" element discussed below could also be termed a "second" element without departing from the teachings of the present disclosure.

Spatially relative terms, such as "below," "above," and the like, may be used herein for ease of description to describe the relationship of one element to another element, as illustrated in the figures. It will be understood that the spatially relative terms, as well as the illustrated configurations, are intended to encompass different orientations of the apparatus in use or operation in addition to the orientations described herein and depicted in the figures. For example, if the apparatus in the figures is turned over, elements described as "below" or "beneath" other elements or features would then be oriented "above" the other elements or features. Thus, the exemplary term, "above," may encompass both an orientation of above and below. The apparatus may be otherwise oriented, e.g., rotated 90 degrees or at other orientations, and the spatially relative descriptors used herein interpreted accordingly.

In addition, the embodiments of the disclosure are described here with reference to schematic diagrams of ideal embodiments (and an intermediate structure) of the present disclosure, so that changes in a shape as shown due to, for example, manufacturing technology and/or a tolerance may be expected. Therefore, the embodiments of the present disclosure shall not be limited to the specific shapes of a region shown here, but include shape deviations caused by, for example, the manufacturing technology. The regions shown in the drawings are schematic in nature, and the shapes thereof do not represent the actual shapes of the regions of the device, and do not limit the scope of the disclosure.

FIG. 1 is a perspective view illustrating an embodiment of a head mounted display device HMD.

Referring to FIG. 1, the head mounted display device HMD may include a display module DM, a housing HS, and a mounting part MT. The head mounted display device HMD may be mounted on a head portion of a user to provide image information to the user.

The display module DM may display an image, based on an image signal. The display module DM may provide images respectively to left and right eyes of the user. A left eye image corresponding to the left eye of the user and a right eye image corresponding to the right eye of the user may be the same or be different from each other. The head mounted display device HMD may provide a 2D image, a 3D image, a virtual reality image, a 360-degree panorama image, and the like through the display module DM. The display module DM may include at least one of a Liquid Crystal Display (LCD), an Organic Light Emitting Display (OLED), an inorganic light emitting display, and a flexible display. The display module DM may be built in the housing HS or be coupled to the housing HS. The display module DM may receive a command through an interface unit or the like, which is provided in the housing HS.

The housing HS may be located in front of the eyes of the user. Components for operating the head mounted display device HMD may be accommodated in the housing HS. The components will be described in detail with reference to FIG. 2.

The housing HS may include a wireless communication unit, an interface unit, and the like. The wireless communication unit may perform wireless communication with an external terminal, thereby receiving an image signal from the external terminal. For example, the wireless communication unit may communicate with the external terminal, using Bluetooth, radio frequency identification (RFID), infrared data association (IrDA), ZigBee, near field communication (NFC), wireless-fidelity (Wi-Fi), and ultra-wideband (UWB). The interface unit may connect the head mounted display device HMD to an external device. For example, the interface unit of the head mounted display device HMD may include at least one of a wired/wireless headset port, an external charger port, a wired/wireless data port, a memory card port, a port for connecting a device provided with an identification module, an audio input/output (I/O) port, a video I/O port, and an earphone port.

The mounting part MT may be connected to the housing HS to allow the head mounted display device HMD to be fixed to the head portion of the user. For example, the mounting part MT may be implemented as a belt, an elastic band, or the like.

In FIG. 1, the head mounted display device HMD is exemplarily illustrated. However, embodiments are not limited thereto, and may be applied to various types of display devices including the display module DM.

Figure 2:
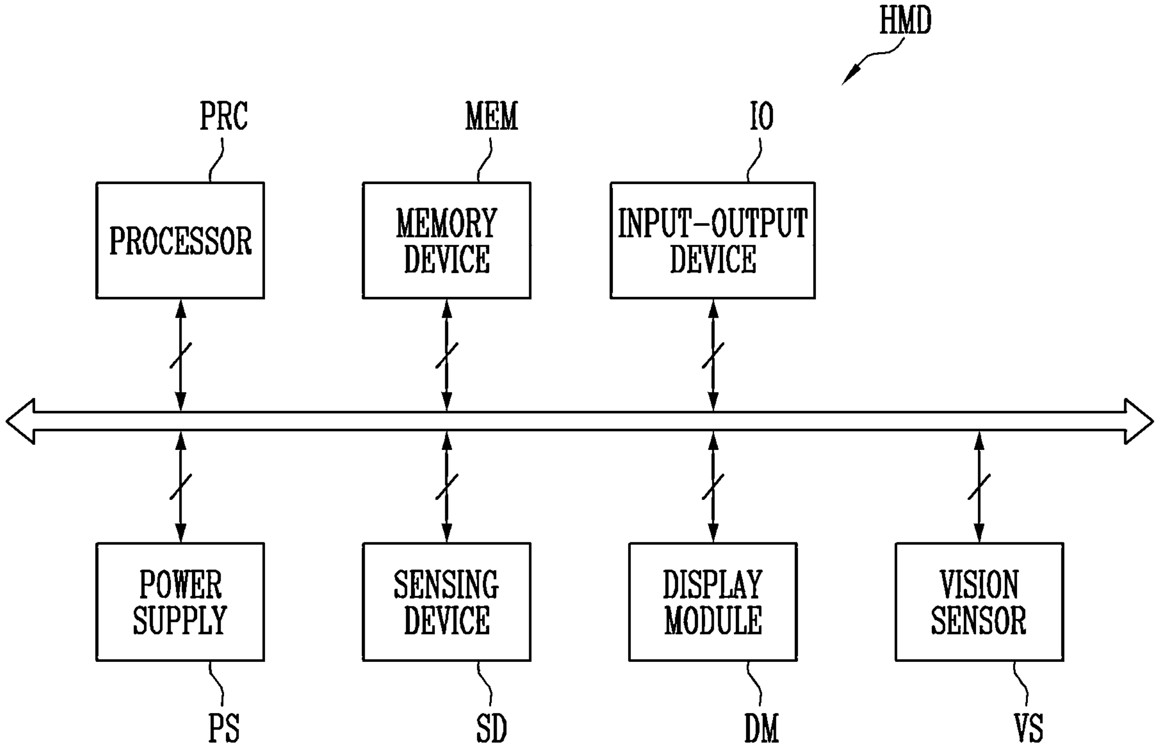
FIG. 2 is a block diagram illustrating a head mounted display device in accordance with an embodiment of the present disclosure.

FIG. 2 is a block diagram illustrating a head mounted display device HMD in accordance with an embodiment of the present disclosure.

Referring to FIG. 2, the head mounted display device HMD may include a processor PRC, a memory device MEM, an input/output device IO, a power supply PS, a sensing device SD, a display module DM, and a visual sensor VS.

The processor PRC may perform specific calculations or tasks. The processor PRC may control overall operations of the head mounted display device HMD. The processor PRC may process signals, data information, and the like, which are input through the input/output device IO, or execute an application program stored in the memory device MEM, to provide appropriate information or functions to a user by processing the signals and the data information. In an embodiment, the processor PRC may be a microprocessor, a central processing unit (CPU), a graphics processing unit (GPU), an application processor (AP), a communication processor (CP), or the like. The processor PRC may be connected to other components through an address bus, a control bus, a data bus, and the like. Also, the processor PRC may also be connected to an extension bus such as a peripheral component interconnect (PCI) bus.

The memory device MEM may store data necessary for operations of an electronic device. The memory device MEM may store a plurality of application programs executed in the head mounted display device HMD, data for operations of the head mounted display device HMD, commands, and the like. At least some of the application programs may be downloaded from an external server through the input/output device IO. For example, the memory device MEM may include a volatile memory device such as a dynamic random access memory (DRAM), a static random access memory (SRAM), or a mobile DRAM, and/or a nonvolatile memory device such as an erasable programmable read-only memory (EPROM), an electrically erasable programmable read-only memory (EEPROM), a flash memory, a phase change random access memory (PRAM), a resistance random access memory (RRAM), a magnetic random access memory (MRAM), or a ferroelectric random access memory (FRAM).

The input/output device IO may include an input means including a camera or an image input unit, which is used to input an image signal, a microphone or an audio input unit, which is used to input an audio signal, a user input unit, e.g., a touch key, a push key, a joystick, a wheel key, or the like, for receiving information from the user, and the like. The input/output device IO may further include an output means for generating an output signal related to a visual sense, an auditory sense, a tactile sense, or the like, which includes an audio output unit, a haptic module, an optical output unit, and the like. The display module DM may be provided in the input/output device IO.

The power supply PS may supply power necessary for operations of the head mounted display device HMD. The power supply PS may be applied with an external power source and an internal power source to supply power to each of the components included in the head mounted display device HMD. The power supply PS may include a battery, and the battery may be implemented as an embedded battery or a replaceable battery.

The sensing device SD may include at least one sensor for sensing peripheral environmental information surrounding the head mounted display device HMD, user information, and the like. For example, the sensing device SD may include a speed sensor, an acceleration sensor, a gravity sensor, an illuminance sensor, a motion sensor, a fingerprint recognition sensor, an optical sensor, an ultrasonic wave sensor, a heat sensor, and the like.

The display module DM may be connected to other components through the buses or other communication links. The display module DM may display information processed by the head mounted display device HMD.

The visual sensor VS may include a camera for photographing an eye of the user. The visual sensor VS may acquire an image corresponding to the photographed eye of the user. For example, the visual sensor VS may include an infrared camera using a bright pupil method or an infrared camera using a dark pupil method. In the bright pupil method, the visual sensor VS (or the infrared camera) may acquire an image corresponding to the eye of the user by lightening the center of a pupil of the eye of the user through irradiation of light (infrared light) to be parallel to the central axis of the pupil distant at a predetermined distance from the eye of the user as a detection target and detecting light reflected from a retina of the eye of the user. In the dark pupil method, the visual sensor VS (or the infrared camera) may acquire an image corresponding to the eye of the user by allowing the center of the pupil of the eye of the user to be darker than an iris of the eye of the user through irradiation of light (infrared light) to form a predetermined angle with the central axis of the pupil of the eye of the user as a detection target and detecting light reflected from the retina of the eye of the user. However, the embodiment of the present disclosure is not limited thereto, and the visual sensor VS may include both the infrared camera using the bright pupil method or the infrared camera using the dark pupil method.

Figure 4:
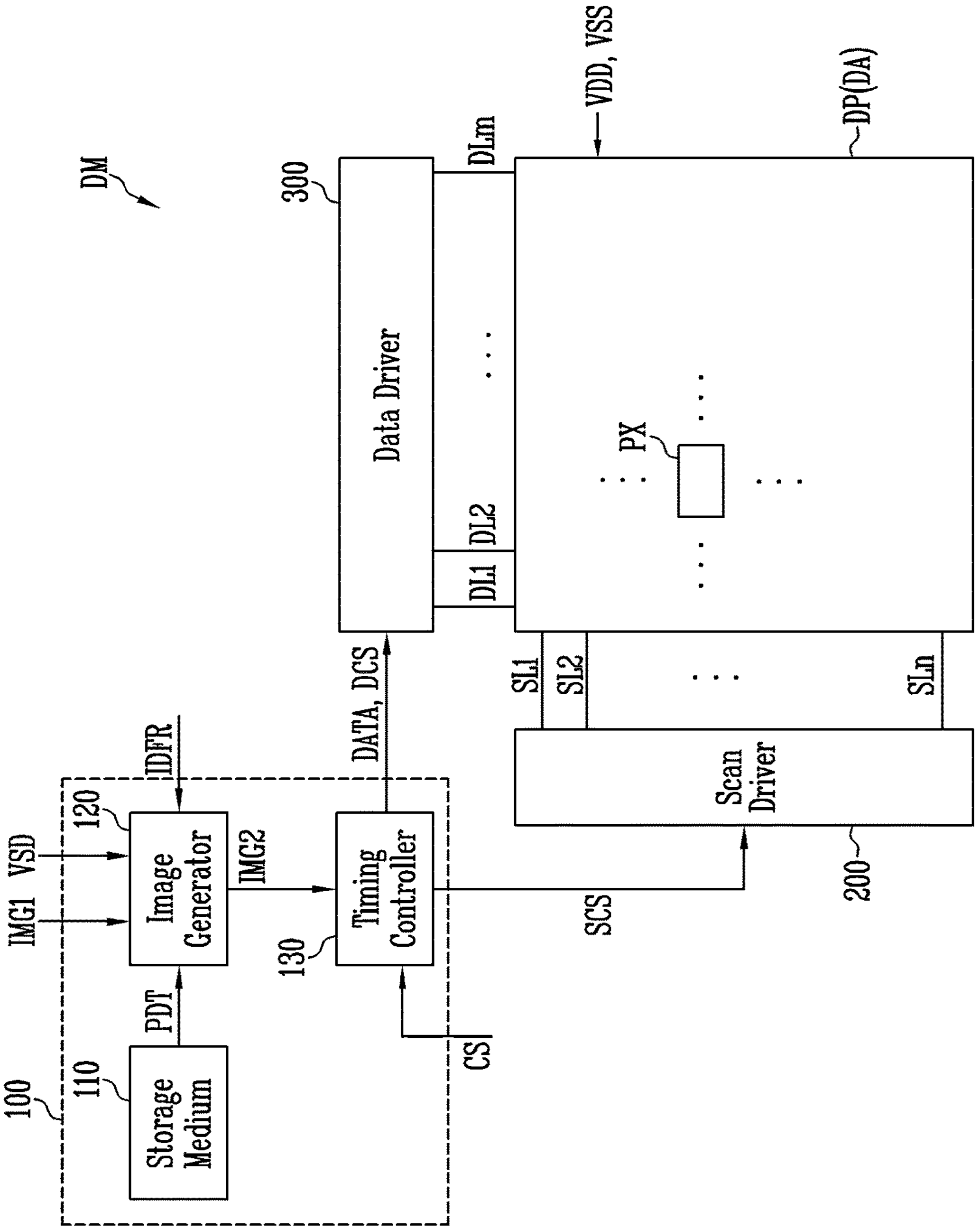
FIG. 4 is a block diagram illustrating an embodiment of the display module shown in FIG. 2.

The visual sensor VS may generate visual sensing data VSD, e.g., see FIG. 4, based on the acquired image. The generated visual sensing data VSD may be transmitted to the display module DM.

Figure 3:
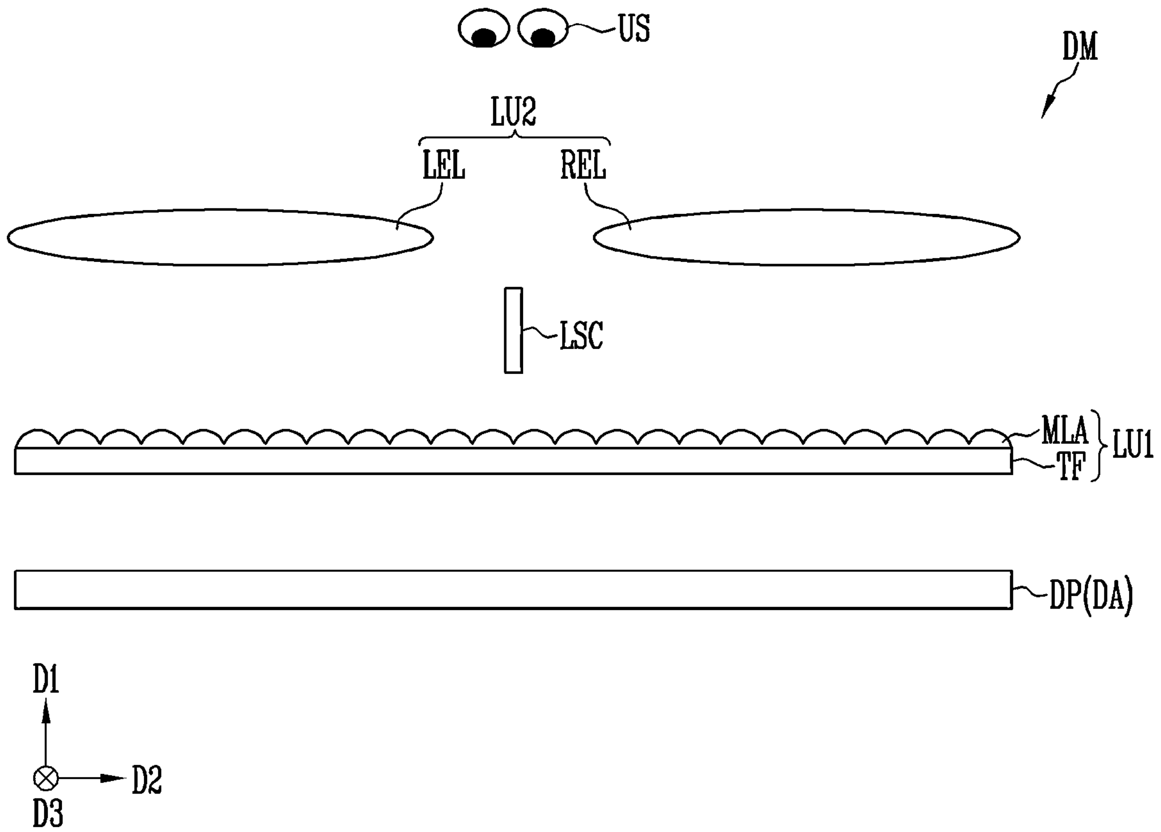
FIG. 3 is a sectional view illustrating an embodiment of a display module shown in FIG. 2.

FIG. 3 is a sectional view illustrating an embodiment of the display module DM shown in FIG. 2.

Referring to FIG. 3, the display module DM may include a display panel DP, a first lens unit LU1, a light screen LSC, and a second lens unit LU2.

The display panel DP may display an image on a display area DA, based on a data signal. In an embodiment, the display panel DP may include, as the display area DA, a first sub-display area and a second sub-display area. For example, when the display module DM is included in the head mounted display device HMD described with reference to FIGS. 1 and 2, the display panel DP may include the first sub-display area for displaying a left eye image and the second sub-display area for displaying a right eye image so as to provide images respectively to a left eye and a right eye of a user US.

The first lens unit LU1 may include a micro lens array MLA and a thin film layer TF. The first lens unit LU1 may provide a natural image to the user US through the micro lens array MLA. For example, when the display panel DP is formed as a flat panel, the display panel DP may display a distorted image. The micro lens array MLA may correct the distortion by perform inverse distortion on the image of the display panel DP. Accordingly, the display module DM can provide a natural image to the user US.

The thin film layer TF may support the micro lens array MLA. The thin film layer TF may be made of polycarbonate (PC), polymetal methacrylate (PMMA), or the like. However, the material is not limited thereto as long as it has a high light transmittance, to efficiently transfer light of an image passing through the thin film layer TF to the user US.

The light screen LSC may be disposed between the first lens unit LU1 and the second lens LU2. The light screen LSC may be disposed at a right angle with respect to the first lens unit LU1. For example, a plane, e.g., parallel to a first direction D1, on which the light screen LSC is located may be perpendicular to a plane, e.g., parallel to a second direction D2 and a third direction D3, on which the first lens unit LU1 is located.

The light screen LSC is configured such that a beam representing a 3D virtual image can be projected along a pre-designed path. Thus, crosstalk can be prevented from being caused when the beam is projected onto the eyes of the user. For example, the light screen LSC may project, onto only the left eye, a light field image which is to be projected onto the left eye. Similarly, the light screen LSC may project, onto only the right eye, a light field image which is to be projected onto the right eye. A light field image may be an image projected onto an eye of the user US through the first lens unit LU1. Accordingly, the light screen LSC prevents the crosstalk, thereby ensuring optimum image quality.

The second lens unit LU2 may allow light from the display area DA to pass therethrough such that the brightness of an image is uniformly sensed by the user US. For example, the light from the display area DA may be inverse-distorted by the first lens unit LU1 to mostly travel straight in the first direction D1. Accordingly, the brightness of an image passing through only the first lens unit LU1 may not be uniformly sensed by the user US. For example, the brightness of an image within a range in which a field of view (FOV) is large may be sensed darkly by the user US. The brightness of an image passing through the second lens unit LU2 may be uniformly sensed by the user US at a certain FOV.

The second lens unit LU2 may include a left eye lens LEL and a right eye lens REL, which respectively correspond to the left eye and the right eye of the user US. The FOV and Pixel Per Degree (PPD) of the display module DM may vary according to the left eye lens LEL and the right eye lens REL, which are included in the second lens unit LU2. For example, the FOV of an image provided to the user US may be increased by the left eye lens LEL and the right eye lens REL, which are included in the second lens unit LU2. Since a larger number of pixels are included in a view of the user US, the PPD may be increased. Accordingly, the user US can view a clear image in a set FOV.

As such, the FOV and PPD of the display module DM may be changed according to the first lens unit LU1 and the second lens unit LU2, which are disposed on the display area DA.

FIG. 4 is a block diagram illustrating an embodiment of the display module DM shown in FIG. 2.

Referring to FIG. 4, the display module DM may include a display panel DP, a controller 100, a scan driver 200, and a data driver 300.

The display panel DP may include a plurality of scan lines SL1 to SLn, where n is an integer greater than 0, a plurality of data lines DL1 to DLm, where m is an integer greater than 0, and a plurality of pixels PX.

Each of the pixels PX may be connected to at least one of the scan lines SL1 to SLn and at least one of the data lines DL1 to DLm. The pixel PX may emit light with a luminance corresponding to a data signal provided through the corresponding data line in response to a scan signal provided through the corresponding scan line. Meanwhile, the pixels PX may be supplied with voltages of a first power source VDD and a second power source VSS. For example, the display module DM may further include a voltage generator for providing the voltages of the first power source VDD and the second power source VSS. The voltages of the first power source VDD and the second power source VSS are voltages necessary for operations of the pixels PX. For example, the first power source VDD may have a voltage level higher than a voltage level of the second power source VSS.

Each of the pixels PX may include a light emitting element and a pixel driving circuit connected to the light emitting element. For example, the light emitting element may be configured as an organic light emitting diode or an inorganic light emitting diode such as a micro LED (light emitting diode) or a quantum dot light emitting diode. Also, the light emitting element may be a light emitting element configured with a combination of an organic material and an inorganic material. In an embodiment, each of the pixels PX may include a single light emitting element. In an embodiment, each of the pixels PX may include a plurality of light emitting elements, and the plurality of light emitting elements may be connected in series, parallel or series/parallel to each other.

The controller 100 may include a storage medium 110, an image generator 120, and a timing controller 130.

The storage medium 110 may pre-store a parameter data table PDT. For example, the parameter data table PDT may be stored in the storage medium 110 in a manufacturing process of the display module DM. For example, before the display panel DP shown in FIG. 3 is coupled to the first and second lens units LU1 and LU2, the parameter data table PDT may be stored in the storage medium 110. In another example, in a test phase after the head mounted display device HMD is manufactured, the parameter data table PDT may be stored in the storage medium 110. The stored parameter data table PDT may be transmitted to the image generator 120.

In embodiments, the storage medium 110 may include a nonvolatile memory device such as an erasable programmable read-only memory (EPROM), an electrically erasable programmable read-only memory (EEPROM), a flash memory, a phase change random access memory (PRAM), a resistance random access memory (RRAM), a magnetic random access memory (MRAM), or a ferroelectric random access memory (FRAM).

The image generator 120 may receive an identifier IDFR from the outside. For example, in power-on of the head mounted display device HMD, an external host such as the processor PRC shown in FIG. 2 may provide the identifier IDFR to the controller 100 of the display module DM. The provided identifier IDFR may be provided to the image generator 120.

The image generator 120 may receive the visual sensing data VSD from the visual sensor VS shown in FIG. 2. For example, the visual sensing data VSD may include image data obtained by photographing an eye of the user US, e.g., see FIG. 3.

Also, the image generator 120 may receive an input image IMG1 from the processor PRC, e.g., see FIG. 2. The input image IMG1 may include a stream of a plurality of frames. Each of the plurality of frames may include data pixels corresponding to the pixels PX of the display panel DP, and each of the data pixels may include at least one grayscale.

Also, the image generator 120 may generate a converted image IMG2 by adjusting grayscales in a partial area of the input image IMG1, based on the received identifier IDFR, the received visual sensing data VSD, and the received parameter data table PDT. The image generator 120 may transmit the generated converted image IMG2 to the timing controller 130.

The head mounted display device HMD shown in FIG. 2 operates after the head mounted display device HMD is mounted on the head portion of the user, and therefore, a distance between the display module DM (or the display panel DP) and the eye of the user US shown in FIG. 3 may be relatively short. In addition, since the viewing range of the user US is restrictive, the user US may not visually recognize the whole of the display area DA. For example, the display area DA may include an area which is not visually recognized by the user US and/or an area recognized by the user with a stimulus visually lower than a stimulus of another area.

Accordingly, when the user US views an image displayed on the display area DA of the display module DM, the display area DA may be divided into a visible area visually recognized by the user US and a non-visible area according to a sight of the user US, a viewing range, and the like. The non-visible area may mean an area which is not visually recognized by the user US or an area recognized by the user US with a stimulus visually lower than a stimulus of another area. The non-visible area may correspond to an area except the visible area in the display area DA. Since an image displayed in the non-visible area is not recognized by the user US (or is relatively little recognized), unnecessary power consumption may occur in the non-visible area when the display module DM (or the display panel DP) displays, in the non-visible area, an image with the same luminance as the visible area.

In accordance with embodiments of the present disclosure, the image generator 120 may generate the converted image IMG2 by adjusting grayscales in a partial area of the input image IMG1, based on the received identifier IDFR, the received visual sensing data VSD, and the received parameter data table PDT. For example, the image generator 120 may extract visual information on a sight of the user US and a viewing range of the user US, based on the visual sensing data VSD, and determine a visible area and a non-visible area on the display area DA, based on the visual information. The image generator 120 may generate the converted image IMG2 by adjusting, e.g., decreasing, grayscales of data pixels corresponding to an area at the periphery of the visible area in the input image IMG1. For example, the image generator 120 may generate the converted image IMG2 by adjusting grayscales of data pixels of the non-visible area in the input image IMG1. Accordingly, the display module DM can minimize or at least reduce power consumption while not deteriorating visibility felt by the user US.

The timing controller 130 may receive a control signal CS from an external processor, e.g., the processor PRC shown in FIG. 2. The control signal CS may include a horizontal synchronization signal, a vertical synchronization signal, a clock signal, and the like. The timing controller 130 may generate a first control signal SCS and a second control signal DCS, based on the control signal CS. The first control signal SCS may be provided to the scan driver 200, and the second control signal DCS may be provided to the data driver 300.

Also, the timing controller 130 may generate image data DATA, based on the converted image IMG2 provided from the image generator 120.

Meanwhile, in FIG. 4, it is illustrated that the image generator 120 and the timing controller 130 are components separate from each other. However, this is merely illustrative, and the image generator 120 may be included in the timing controller 130. For example, the image generator 120 may be implemented in a form in which the image generator 120 is built in the timing controller 130.

The scan driver 200 may receive the first control signal SCS from the timing controller 130, and supply a scan signal to the scan lines SL1 to SLn, based on the first scan signal SCS. For example, the scan signal may be sequentially supplied to the scan lines SL1 to SLn.

The scan signal may be set to a gate-on voltage, e.g., a low voltage or a high voltage. A transistor receiving the scan signal may be set to be in a turn-on state when the scan signal is supplied thereto.

The data driver 300 may receive the second control signal DCS and the image data DATA from the timing controller 130. The data driver 300 may supply, to the data lines DL1 to DLm, a data signal (or data voltage) corresponding to the converted image IMG2 (or the image data DATA) in response to the second control signal DCS.

FIG. 5 is a diagram conceptually illustrating an embodiment of the parameter data table PDT stored in the storage medium 110 shown in FIG. 4.

Referring to FIG. 5, the parameter data table PDT may include first to nth parameter data PD1 to PDn, where n is an integer greater than 0, respectively corresponding to first to nth identifiers IDFR1 to IDFRn.

Each of the first to nth identifiers IDFR1 to IDFRn may represent a type of the display module DM shown in FIG. 3. For example, each of the first to nth identifiers IDFR1 to IDFRn may indicate the display module DM including a combination of any one of types of the first lens unit LU1 included in the display module DM shown in FIG. 3, any one of types of the second lens unit LU2 included in the display module DM, and any one of types of the display panel DP included in the display module DM.

The first to nth parameter data PD1 to PDn may respectively correspond to the first to nth identifiers IDFR1 to IDFRn. In embodiments, each parameter data may be determined in relation to a FOV and a PPD of the display module DM, which correspond to a corresponding identifier. For example, the FOV and PPD of the display module DM may be determined by the first lens unit LU1 and/or the second lens unit LU2. In embodiments, each parameter data may be determined in further relation to a maximum luminance value of an image displayed by the display module DM, which corresponds to a corresponding identifier. For example, the maximum luminance value may be determined by the display panel DP. As such, each parameter data may be determined by a combination of a type of the first lens unit LU1 included in the display module DM, a type of the second lens unit LU2 included in the display module DM, and a type of the display panel DP included in the display module DM, which correspond to a corresponding identifier.

Figure 6:
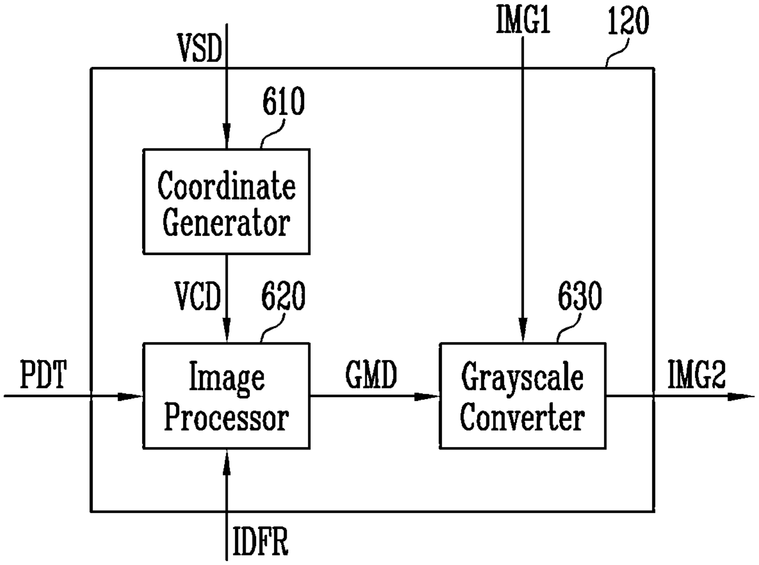
FIG. 6 is a block diagram illustrating an embodiment of an image generator shown in FIG. 4.
Figure 7:
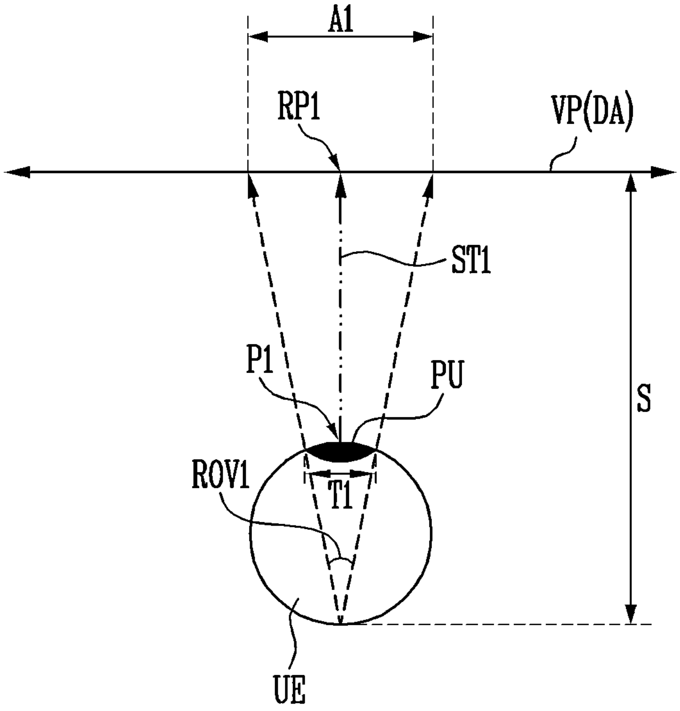
FIGS. 7, 8, and 9 are views illustrating an example of an operation of a coordinate generator included in the image generator shown in FIG. 6.
Figure 8:
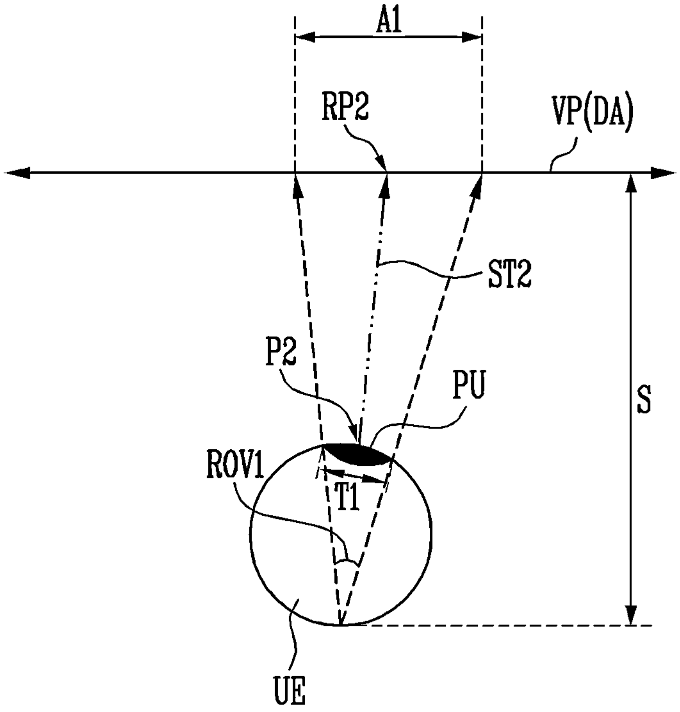
Figure 9:
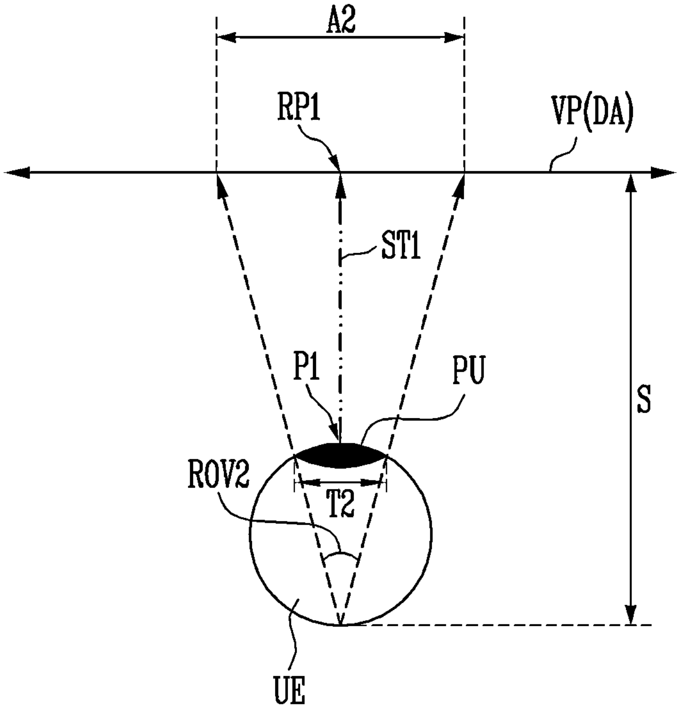

FIG. 6 is a block diagram illustrating an embodiment of the image generator 120 shown in FIG. 4. FIGS. 7 to 9 are views illustrating an example of an operation of a coordinate generator 610 included in the image generator 120 shown in FIG. 6.

Referring to FIG. 6, the image generator 120 may include the coordinate generator 610, an image processor 620, and a grayscale converter 630.

The coordinate generator 610 may determine a sight reference point of the user US, e.g., see FIG. 3, viewing the display area DA on the display area DA, based on the visual sensing data VSD. For example, the coordinate generator 610 may sense a position of a pupil of an eye of the user US, based on the visual sensing data VSD, and estimate a sight of the user US according to the sensed position of the pupil of the eye of the user US. Accordingly, the coordinate generator 610 can determine the sight reference point of the user US on the display area DA according to the estimated sight of the user US.

Referring to FIG. 7 together with FIG. 6, when a center position of a pupil PU of a user eye UE is a first position P1, the coordinate generator 610 may estimate, as a sight of a user US, e.g., a first sight ST1, sometimes called a first sight line ST1, an extension line according to a normal direction at the first position P1 with respect to the user eye UE corresponding to the shape of a sphere.

The coordinate generator 610 may determine, as the sight reference point, e.g., a first reference point RP1, of the user US, a point at which a sight, e.g., the first sight ST1, of the user US, which corresponds to the first position P1, and a virtual plane VP meet each other. The virtual plane VP may correspond to the display area DA.

Also, the coordinate generator 610 may extract a size of the pupil PU of the user US, based on the visual sensing data VSD, and determine a range of the sight of the user US. For example, the coordinate generator 610 may extract a size of the pupil PU, based on the visual sensing data VSD, and determine a viewing range corresponding to an area (hereinafter, referred to as a viewing area) which the user US can visually recognize on the display area DA through the pupil PU, based on the extracted size of the pupil PU.

Referring to FIG. 7 together with FIG. 6, when a size (or diameter) of the pupil PU of the user eye UE is a first size T1, the coordinate generator 610 may determine a first viewing range ROV1 corresponding to an area, e.g., a first viewing area A1, which the user US can visually recognize through the pupil PU by using the first size T1. The viewing range may correspond to an angle with respect to both ends of the pupil PU from a retina of the user eye UE. The coordinate generator 610 may determine the first viewing area A1 by using a distance S between the virtual plane VP and the retina of the user eye UE and the first viewing range ROV1. In embodiments, the head mounted display device HMD (or the visual sensor VS shown in FIG. 2) may further include a distance measuring sensor so as to measure the distance S between the retina of the user eye UE and the display area DA, i.e., the virtual plane VP. For example, the distance measuring sensor may be an ultrasonic sensor which measures a distance between the retina of the user eye UE and the display panel DP (or the display area DA) by measuring a time for which an ultrasonic wave is reflected and then returned.

Meanwhile, when the user US views an image, using the head mounted display device HMD, the sight of the user US may be changed according to a viewing environment for the image of the user US, a sight change caused by movement of the image, and the like. Accordingly, the position of a viewing area which the user US visually recognizes on the display area DA may be changed.

For example, as shown in FIG. 8, the center position of the pupil PU of the user eye UE is a second position P2, the coordinate generator 610 may estimate, as a sight of the user US, e.g., a second sight ST2, sometimes called a second sight line ST2, an extension line according to a normal direction at the second position P2 with respect to the user eye UE.

The coordinate generator 610 may determine, as a sight reference point, e.g., a second reference point RP2, of the user US, a point at which a sight, e.g., the second sight ST2, of the user US, which corresponds to the second position P2, and the virtual plane VP meet each other.

Meanwhile, in FIGS. 7 and 8, since the size (or diameter) of the pupil PU of the user eye UE is the same as the first size T1, a viewing area and a viewing range, which are estimated by the coordinate generator 610 in FIG. 8, may be identical to the first viewing area A1 and the first viewing range ROV1, which are estimated by the coordinate generator 610 in FIG. 7.

In addition, when the user US views an image, using the head mounted display device HMD, the viewing range of the user US may be changed as the size of the pupil PU of the user US is changed according to a luminance of a display image, brightness of external light, or the like, e.g., when the luminance of the display image or the brightness of the external light is increased, the size of the pupil PU of the user US becomes smaller. The size (or extent) of the viewing area of the user US on the display area DA may be changed.

For example, as shown in FIG. 9, when the size (or diameter) of the pupil PU of the user eye UE is a second size T2, the coordinate generator 610 may determine a second viewing range ROV2 corresponding to an area, e.g., a second viewing area A2, which the user US can visually recognize through the pupil PU from the retina of the user eye UE by using the second size T2. Also, as similarly described with reference to FIG. 7, the coordinate generator 610 may determine the second viewing area A2 by using the distance S between the virtual plane VP and the pupil PU of the user eye UE and the second viewing range ROV2. Since the extent of the area which the user US can visually recognize becomes wider as the size of the pupil PU becomes larger, the viewing range may also become larger. For example, the first viewing range ROV1 corresponding to the first size T1 may be smaller than the second viewing range ROV2 corresponding to the second size T2 greater than the first size T1.

Referring back to FIG. 6, the coordinate generator 610 may generate visual coordinate data VCD by determining a viewpoint coordinate of the user, based on the determined sight reference point of the user and the determined viewing area. For example, the coordinate generator 610 may extract a position of the sight reference point of the user on the determined viewing area, and determine a viewpoint coordinate on the display area, based on the position of the sight reference point of the user. The viewpoint coordinate may be a coordinate of a point corresponding to the sight reference point in the display area DA. The viewpoint coordinate may be determined by referring to the viewing area and the sight reference point. The coordinate generator 610 may transmit, to the image processor 620, the visual coordinate data VCD including viewpoint coordinates VC1 and VC2, e.g., see FIGS. 10-13.

The image processor 620 may extract parameter data corresponding to the received identifier IDFR from the parameter data table PDT. For example, referring to FIG. 5, the first parameter data PD1 corresponding to the first identifier IDFR1 when the first identifier IDFR1 is received.

In embodiments, the image processor 610 may determine a size (or extent) of an area (hereinafter, referred to as an expression area) in which an image can be expressed through the display module DM, based on the extracted parameter data. For example, the size of an expression area of an image provided to the user US may vary according to the second lens unit LU2 embedded in the head mounted display device HMD. The image processor 620 may determine a maximum FOV of an image expressed by the second lens unit LU2, based on the parameter data. Accordingly, the image processor 620 may determine the size (or extent) of the expression area.

The image processor 620 may generate gain map data GMD, based on the viewpoint coordinate data VCD and the parameter data. For example, the image processor 620 may identify a reference area of the user US on the display area DA, e.g., see FIG. 3, (or the expression area), based on the viewpoint coordinate data VCD and the parameter data. For example, the image processor 620 may generate viewpoint coordinate data VCD for each frame, and define a reference area including a viewpoint coordinate of the viewpoint coordinate data VCD on the display area DA, based on the parameter data.

After that, the image processor 620 may identify a target area in which the display area and the reference area in an input image IMG1 do not overlap with each other. For example, an area at the periphery of the reference area in the display area may be set as the target area. The image processor 620 may generate gain map data GMD corresponding to the target area. For example, the gain map data GMD may include first gain values corresponding to data pixels of the target area and second gain values corresponding to data pixels of an area different from the target area. Each of the first gain values may be smaller than each of the second gain values. For example, each gain value corresponding to a data pixel of the target area may gradually decrease as the corresponding data pixel becomes more distant from the reference area.

The grayscale converter 630 may receive the input image IMG1, and convert the input image IMG1 into a converted image IMG2, based on the gain map data GMD provided from the image processor 620.

In embodiments, the grayscale converter 630 may generate the converted image IMG2 by adjusting grayscale values of data pixels of the input image IMG1 according to the gain map data GMD. For example, the grayscale converter 630 may generate the converted image IMG2 by multiplying the first gain values and the second gain values of the gain map data GMD by the grayscale values of the data pixels of the input image IMG1.

Grayscales of pixels corresponding to the target area in the converted image IMG2 may be lower than grayscales of pixels corresponding to the target area in the input image IMG1. For example, when the input image IMG1 has the same grayscale in the target area, the grayscales of the pixels corresponding to the target area in the converted image IMG2 may be gradually lowered as the pixels become more distant from the reference area.

In embodiments, the grayscale converter 630 may generate the converted image IMG2 by converting grayscales of some pixels corresponding to the target area in the input image IMG1 into grayscale 0 (or black grayscale). For example, grayscales of some pixels corresponding to the target area among the grayscales of the converted image IMG2 may correspond to the grayscale 0. Accordingly, an image is not displayed in a portion of the target area in the display area DA.

Figure 10:
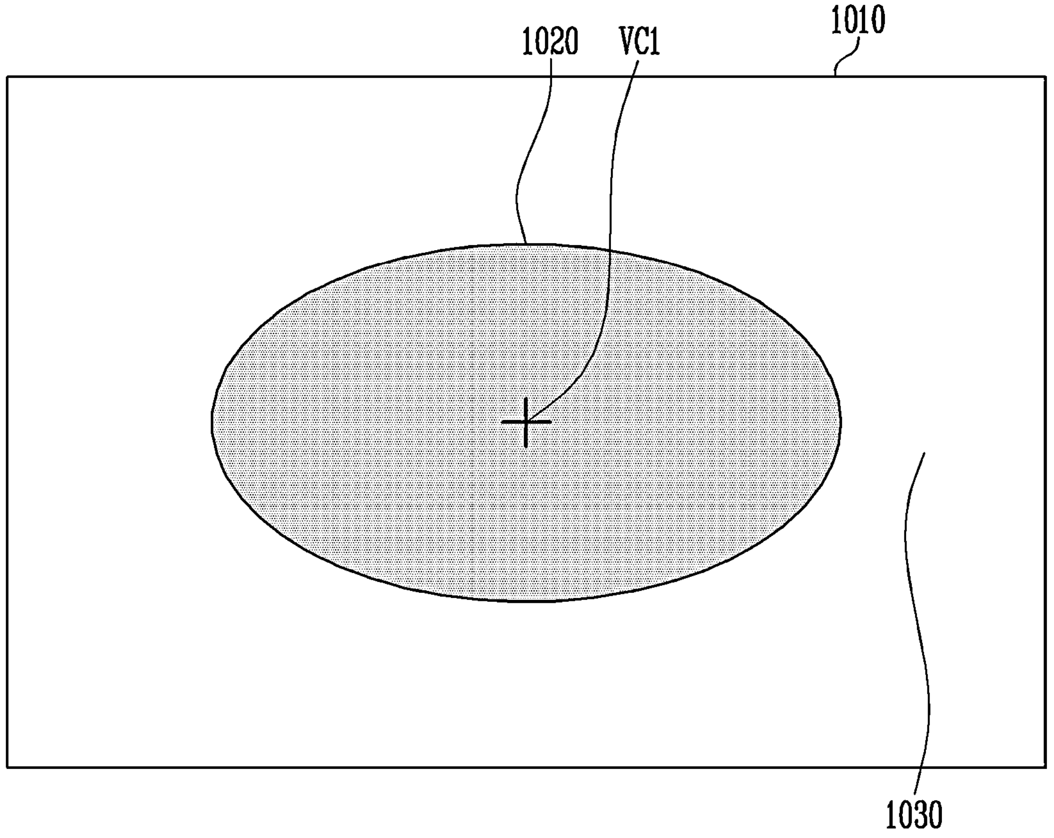
FIG. 10 is a view illustrating an example of an operation of the image generator shown in FIG. 6.
Figure 11:
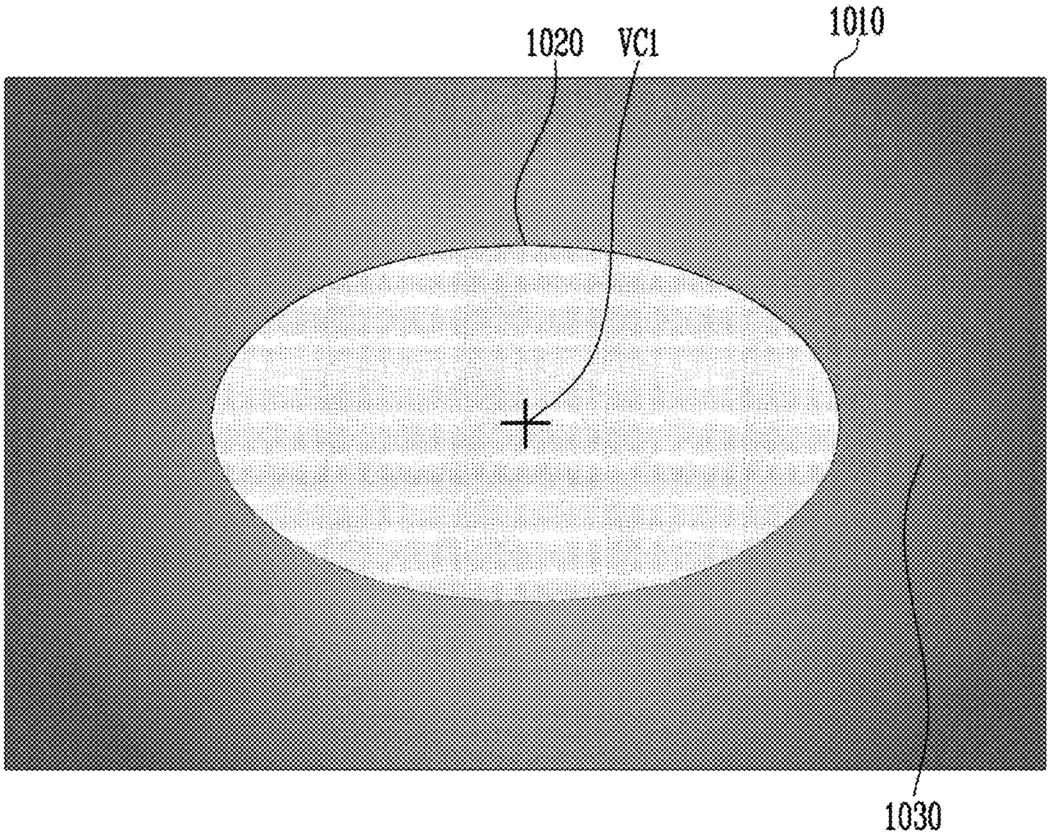
FIG. 11 is a view illustrating an example of a display area when a grayscale of a target area decreases as compared with FIG. 10.

FIG. 10 is a view illustrating an example of an operation of the image generator 120 shown in FIG. 6. FIG. 11 is a view illustrating an example of the display area when a grayscale of a target area decreases as compared with FIG. 10.

Referring to FIGS. 6 and 10, the image processor 620 may determine a first viewpoint coordinate VC1 of the user on a display area 1010 (or expression area), based on the viewpoint coordinate data VCD. The image processor 620 may determine a reference area 1020 including the first viewpoint coordinate VC1 on the display area 1010, based on parameter data. In embodiments, referring to FIG. 7, the reference area 1020 may be determined by further referring to the first viewing area A1. For example, as the first viewing area A1 becomes wider, the reference area 1020 may also become wider.

The image processor 620 may determine the reference area 1020 by considering various elements of the display module DM. For example, the image processor 620 may determine the reference area 1020, based on parameter data, and the parameter data may be determined in relation to a FOV of the display module DM, a PPD, a luminance of an image displayed by the display panel DP, and the like as described above.

The image processor 620 may identify a target area 1030, based on the determined reference area 1020. For example, an area except the reference area 1020 may be set as the target area 1030. In embodiments, the image processor 620 may determine a size of the target area 1030, based on the parameter data.

The image processor 620 may generate gain map data GMD corresponding to the target area 1030. The image processor 620 may transmit the generated gain map data GMD to the grayscale converter 630.

Referring to FIGS. 6 and 11, the grayscale converter 630 may generate a converted image IMG2 by adjusting grayscale values of data pixels of an input image IMG1 according to the gain map data GMD. For example, the grayscale converter 630 may generate the converted image IMG2 by multiplying the gain map data GMD by the grayscale values of the data pixels of the input image IMG1. Grayscales of pixels corresponding to the target area 1030 in the converted image IMG2 may be lower than grayscales of pixels corresponding to the target area 1030 in the input image IMG1. In other words, as shown in FIG. 11, grayscales of pixels corresponding to the target area 1030 in the display area 1010 may decrease as compared with the target area 1030 shown in FIG. 10. For example, when the input image IMG1 has the same grayscale in the target area 1030 as the reference area 1020, the grayscales of the pixels corresponding to the target area 1030 in the converted image IMG2 may be gradually lowered as the pixels become more distant from the reference area 1020.

In accordance with embodiments of the present disclosure, the image processor 620 may determine a reference area including a viewpoint coordinate on the display area DA, based on parameter data, and adjust grayscales of a target area adjacent to the determined reference area. Since the parameter data is determined in relation to various elements, e.g., a FOV of the display module DM, a PPD, a luminance of an image displayed by the display panel DP, and the like, the reference area may be adaptively determined with respect to the display module DM. Accordingly, the display module DM enables the user not to feel that visibility is deteriorated while reducing power consumption.

Figure 12:
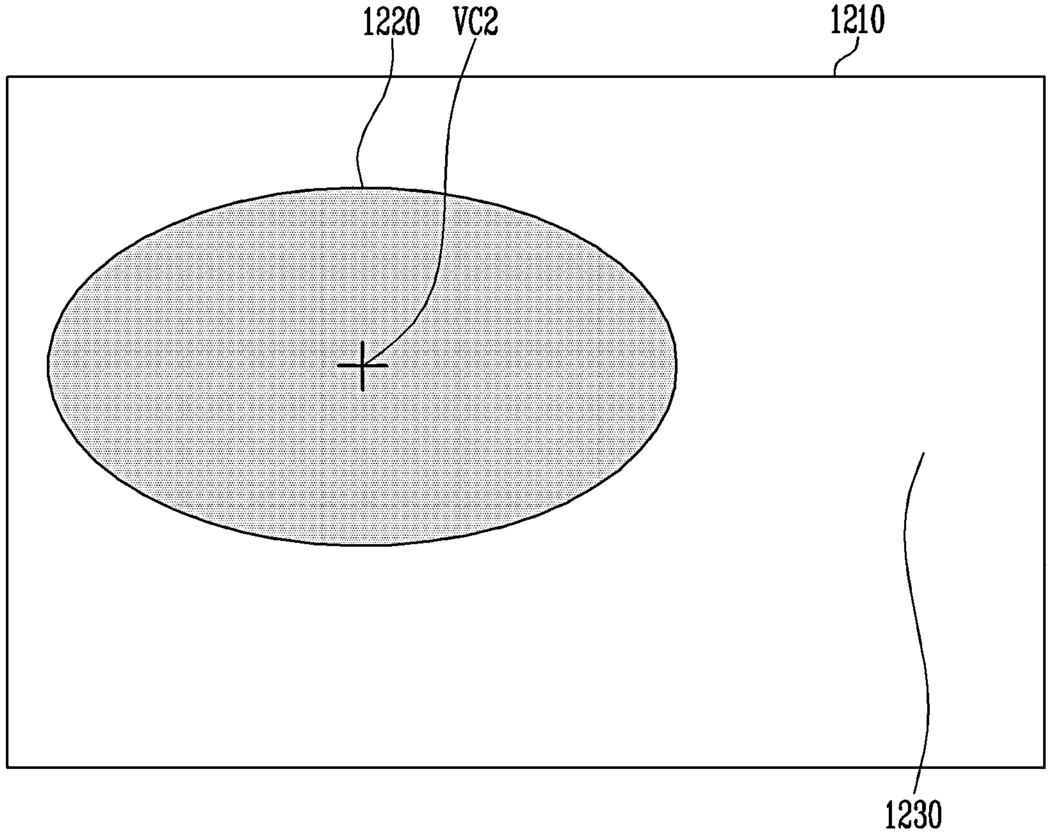
FIG. 12 is a view illustrating an operation of the image generator shown in FIG. 6 when a viewpoint coordinate shown in FIG. 10 is changed.
Figure 13:
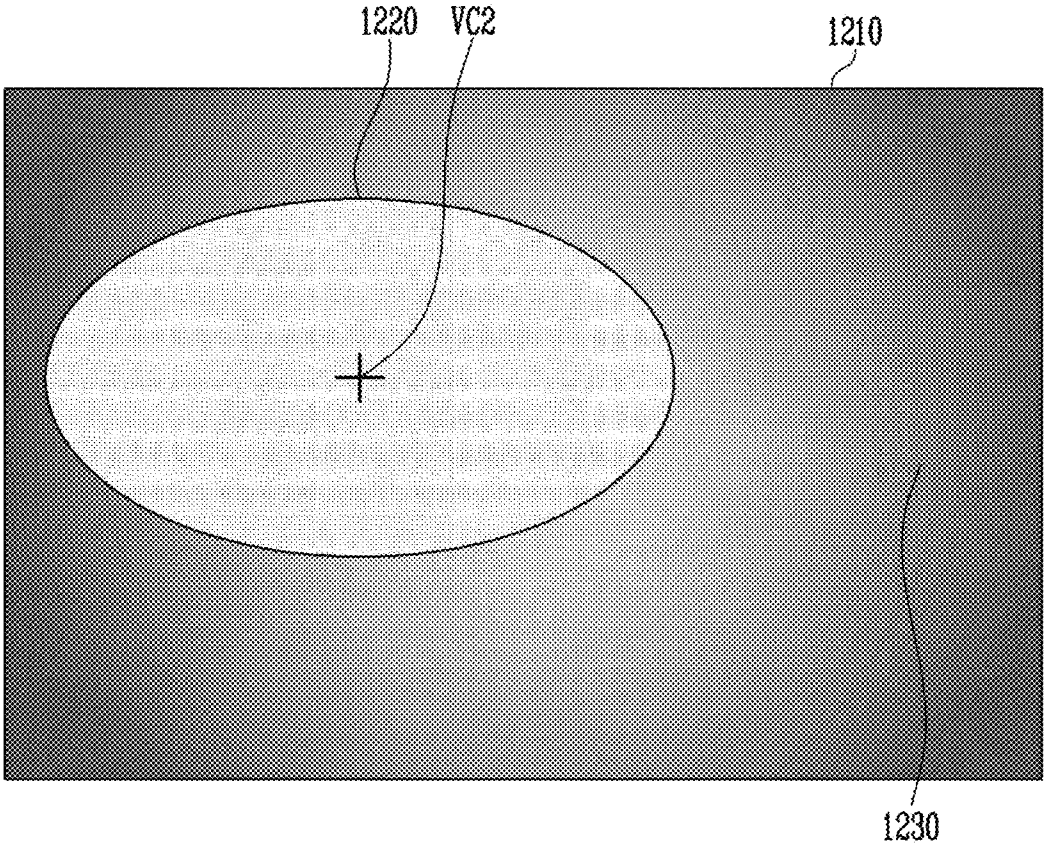
FIG. 13 is a view illustrating an example of the display area when a grayscale of a target area decreases as compared with FIG. 12.

FIG. 12 is a view illustrating an operation of the image generator 120 shown in FIG. 6 when the viewpoint coordinate shown in FIG. 10 is changed. FIG. 13 is a view illustrating an example of the display area when a grayscale of the target area decreases as compared with FIG. 12.

Referring to FIGS. 6 and 12, the image processor 620 may determine a second viewpoint coordinate VC2 of the user on a display area 1210 (or expression area), based on the viewpoint coordinate data VCD.

The image processor 620 may determine a reference area 1220 including the second viewpoint coordinate VC2 on the display area 1210, based on parameter data. In embodiments, referring to FIG. 8, the reference area 1220 may be determined by further referring to the second viewing area A2. For example, as the second viewing area A2 becomes wider, the reference area 1220 may also become wider.

The sight of the user may be changed when frames are displayed in the display area 1210. Accordingly, the viewpoint coordinate of the user may be changed from the first viewpoint coordinate VC1 to the second viewpoint coordinate VC2. In accordance with an embodiment of the present disclosure, the reference area 1020 shown in FIG. 10 may be changed to include a peripheral area of the second viewpoint coordinate VC2, like the reference area 1220 shown in FIG. 12. Accordingly, the target area 1030 shown in FIG. 10 may be changed to a target area 1230 shown in FIG. 12. The image processor 620 may generate gain map data GMD, based on the changed target area 1230.

Subsequently, referring to FIGS. 6 and 13, the grayscale converter 630 may generate a converted image IMG2 by adjusting grayscale values of data pixels of an input image IMG1 according to the gain map data GMD. Grayscales of pixels corresponding to the target area 1230 in the converted image IMG2 may be lower than grayscales of pixels corresponding to the target area 1230 in the input image IMG1. In other words, as shown in FIG. 13, grayscales of pixels corresponding to the target area 1230 in the display area 1210 may decrease as compared with the target area 1230 shown in FIG. 12. For example, when the input image IMG1 has the same grayscale in the target area 1230 as the reference area 1220, the grayscales of the pixels corresponding to the target area 1230 in the converted image IMG2 may be gradually lowered as the pixels become more distant from the reference area 1220.

Figure 14:
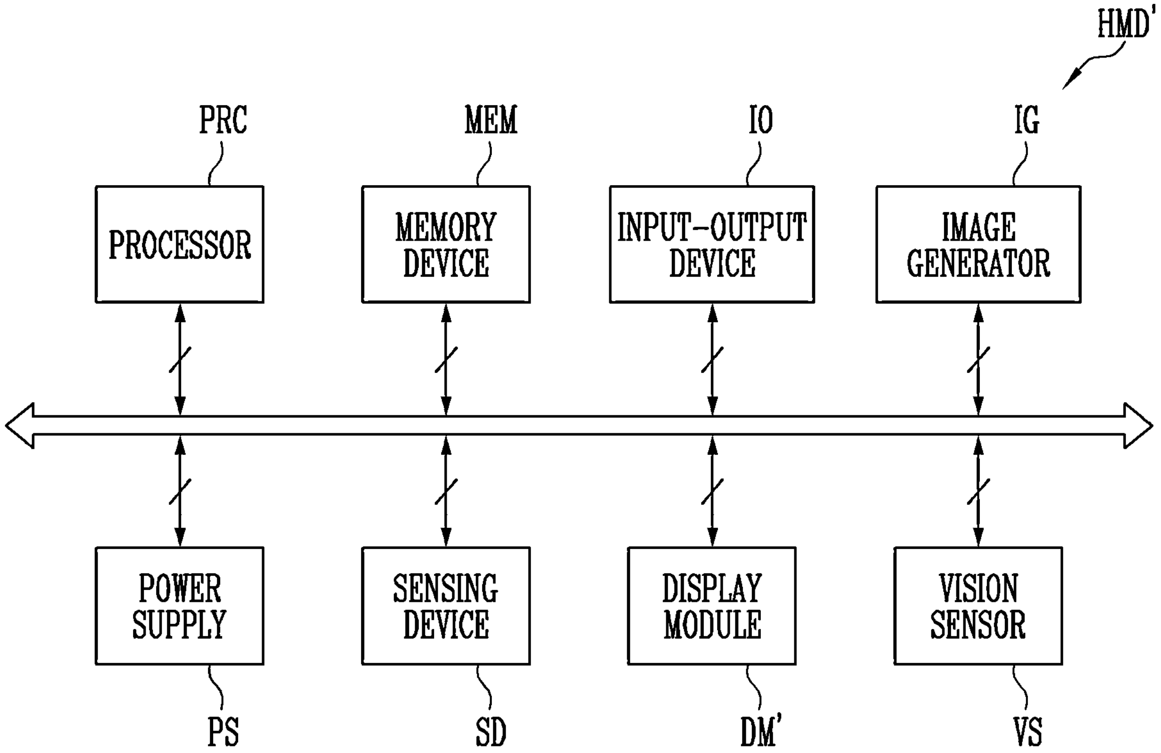
FIG. 14 is a block diagram illustrating an embodiment of the head mounted display device.

FIG. 14 is a block diagram illustrating an embodiment of a head mounted display device HMD'.

Referring to FIG. 14, the head mounted display device HMD' may include a processor PRC, a memory device MEM, an input/output device IO, a power supply PS, a sensing device SD, a display module DM', a visual sensor VS, and an image generator IG.

The processor PRC, the memory device MEM, the input/output device IO, the power supply PS, the sensing device SD, and the visual sensor VS are described identically to the processor PRC, the memory device MEM, the input/output device IO, the power supply PS, the sensing device SD, and the visual sensor VS, which are shown in FIG. 2. Hereinafter, overlapping descriptions will be omitted.

The memory device MEM may store the parameter data table PDT shown in FIG. 4. For example, the parameter data table PDT may be stored in the memory device MEM in a manufacturing process of the head mounted display device HMD'. Also, in a test phase after the head mounted display device HMD' is manufactured, the parameter data table PDT may be stored in the memory device MEM. The stored parameter data table PDT may be transmitted to the image generator IG.

The image generator IG shown in FIG. 14 is described identically to the image generator 120 shown in FIG. 4, except that the image generator IG is provided at the outside of the display module DM' to communicate with components of the head mounted display device HMD' through a system bus. The display module DM' shown in FIG. 14 is described identically to the display module DM shown in FIG. 4, except that the display module DM' receives the second image IMG2 shown in FIG. 4 from the image generator 120 shown in FIG. 4.

The image generator IG may receive an identifier IDFR from the processor PRC. The image generator IG may receive parameter data table PDT from the memory device MEM, and receive visual sensing data VSD from the visual sensor VS.

The image generator IG may generate a converted image by adjusting grayscales of a partial area in an input image, like the image generator 120 shown in FIG. 4. The image generator IG may transmit the converted image to the display module DM'. A timing controller, e.g., see timing controller 130 shown in FIG. 4, of the display module DM' may receive the converted image.

The display module DM' may display an image, based on the received converted image.

Figure 15:
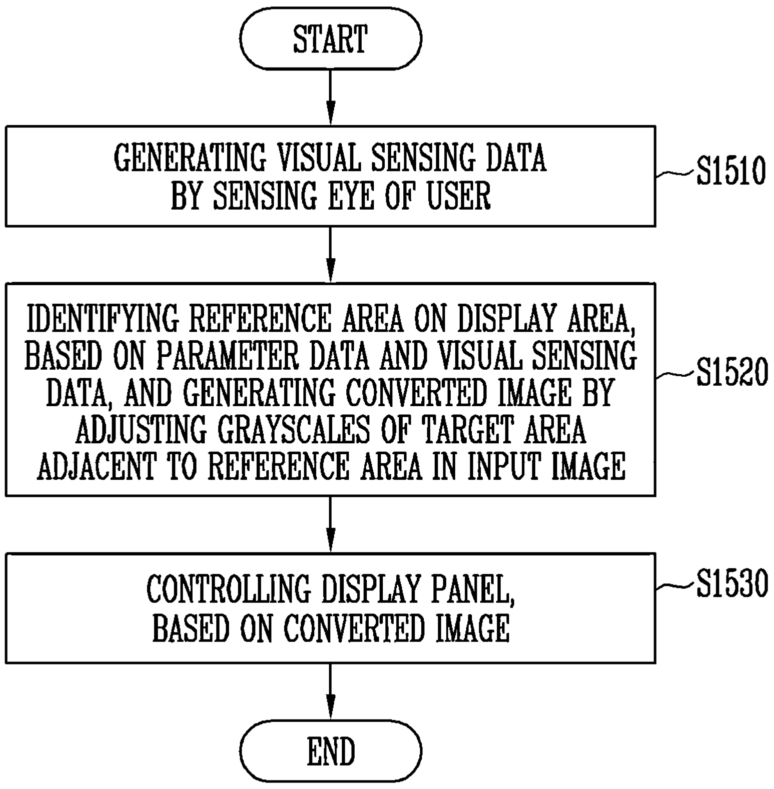
FIGS. 15 and 16 are flowcharts illustrating a method of operating a display module and a display device in accordance with an embodiment of the present disclosure.
Figure 16:
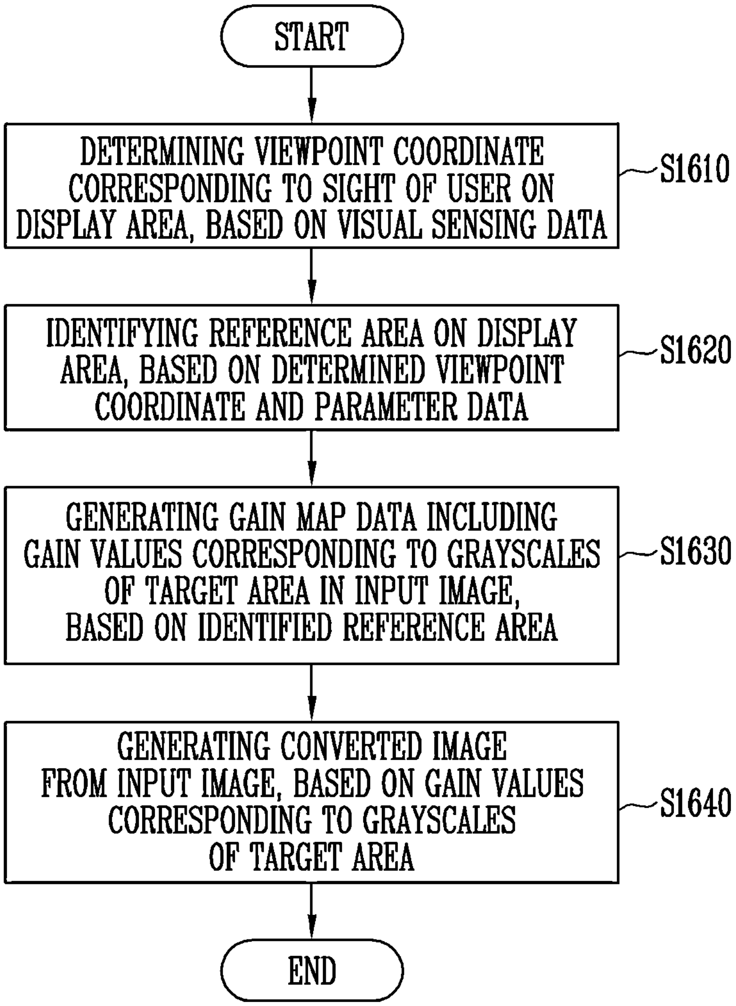

FIGS. 15 and 16 are flowcharts illustrating a method of operating a display module and a display device in accordance with an embodiment of the present disclosure.

FIG. 15 is a flowchart illustrating a method of controlling a display panel in accordance with an embodiment of the present disclosure.

Referring to FIG. 15, the method of operating the display module DM and the display device in accordance with the embodiment of the present disclosure may include an operation S1510 of generating visual sensing data by sensing an eye of a user, an operation S1520 of identifying a reference area on a display area, based on parameter data and the visual sensing data, and generating a converted image by adjusting grayscales of a target area adjacent to the reference area in an input image, and an operation S1530 of controlling the display panel, based on the converted image.

Referring to FIGS. 2 and 15, in the operation S1510, visual sensing data may be generated by sensing an eye of a user. The eye of the user may be photographed using the visual sensor VS shown in FIGS. 2 and 15, and an image corresponding to the photographed eye of the user may be acquired as the visual sensing data.

In the operation S1520, a reference area may be identified based on the visual sensing data and parameter data. A target area adjacent to the reference area may be identified. In addition, a converted image may be generated by adjusting grayscales of the target area in an input image. In some embodiments, the operation S1520 may be performed by the display module DM shown in FIG. 2. In other embodiments, the operation S1520 may be performed by the image generator IG shown in FIG. 14.

In the operation S1530, the display panel may be controlled based on the converted image. The display module DM shown in FIG. 2 and the display module DM' shown in FIG. 14 may receive the converted image and output an image based on the converted image to the user.

FIG. 16 is a flowchart illustrating an embodiment of the operation S1520 shown in FIG. 15.

Referring to FIG. 16, the method of operating the display module DM and the display device in accordance with the embodiment of the present disclosure may include an operation S1610 of determining a viewpoint coordinate corresponding to a sight of the user on a display area, based on visual sensing data, an operation S1620 of identifying a reference area on the display area, based on the determined viewpoint coordinate and parameter data, an operation S1630 of generating gain map data including gain values corresponding to grayscales of a target area in an input image, based on the identified reference area, and an operation S1640 of generating a converted image from the input image, based on the gain values corresponding to the grayscales of the target area.

Referring to FIGS. 6 and 16, in the operation S1610, a viewpoint coordinate corresponding to an eye of a user on a display area e.g. see display area DA shown in FIG. 3, based on visual sensing data VSD. Viewpoint coordinate data VCD representing the determined viewpoint coordinate may be provided.

In the operation S1620, a reference area on the display area may be identified based on the determined viewpoint coordinate and parameter data.

In the step S1630, a target area adjacent to the identified reference area may be determined based on the reference area. Subsequently, gain map data GMD including gain values corresponding to grayscales of the target area in an input image IMG1 may be generated.

In the step S1640, a converted image IMG2 may be generated from the input image IMG1, based on the gain values corresponding to the grayscales of the target area. Each of the gain values corresponding to the grayscales of the target area may be smaller than each of gain values corresponding to grayscales of the reference area. Grayscales of pixels corresponding to the target area in the converted image IMG2 may be lower than grayscales of pixels according to the target area in the input image IGM1. Therefore, the luminance of an image displayed in the target area on the display area DA may be low. Accordingly, power consumption can be reduced while not deteriorating visibility felt by the user.

In accordance with the present disclosure, there can be provided a display module capable of operating with reduced power consumption, a display device including the display module, and a method of operating the display device.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims.

What is claimed is:

1. A display module comprising:

a display panel including a display area for displaying an image;

a lens unit disposed on the display area;

an image generator configured to receive visual sensing data from the outside by sensing an eye of a user, identify a reference area on the display area, based on parameter data and the visual sensing data, and generate a converted image by adjusting grayscales of a target area adjacent to the reference area in an input image; and a controller configured to control the display panel, based on the converted image, wherein the image generator is configured to determine a size of the reference area according to the parameter data, wherein the image generator includes:

a coordinate generator configured to determine a viewpoint coordinate corresponding to a sight of the user on the display area, based on the visual sensing data;

an image processor configured to identify the reference area on the display area, based on the determined viewpoint coordinate and the parameter data, and generate gain map data including gain values corresponding to the grayscales of the target area in the input image, based on the reference area; and a grayscale converter configured to generate the converted image from the input image, based on the gain values corresponding to the grayscales of the target area in the input image.

2. The display module of claim 1, wherein the grayscales of the target area in the converted image are lower than the grayscales of the target area in the input image.

3. The display module of claim 1, wherein the image generator is configured to extract a reference position corresponding to a sight of the eye of the user on the display area according to the visual sensing data, and identify an area adjacent to the reference position as the reference area.

4. The display module of claim 1, further comprising a storage medium configured to store the parameter data.

5. The display module of claim 1, wherein the lens unit allows the image displayed by the display area to pass therethrough such that a brightness of an image expressed by the lens unit is uniformly sensed by the user.

6. The display module of claim 5, wherein the parameter data is provided according to a field of view and a pixel per degree of the image expressed by the lens unit.

7. The display module of claim 6, wherein the parameter data is provided according to a maximum luminance of the image displayed by the display panel.

8. The display module of claim 1, wherein the visual sensing data is generated from each of a first frame and a second frame successive to the first frame, and wherein the image generator generates the converted image corresponding to the first frame, based on the visual sensing data generated in the first frame, and generates the converted image corresponding to the second frame, based on the visual sensing data generated in the second frame.

9. A display device comprising:

a display module including a display panel including a display area for displaying an image and a lens unit disposed on the display area;

a visual sensor configured to generate visual sensing data by sensing an eye of a user; and an image generator configured to identify a reference area on the display area, based on parameter data and the visual sensing data, and generate a converted image by adjusting grayscales of a target area adjacent to the reference area in an input image, wherein the display module controls the display panel, based on the converted image, and wherein the image generator is configured to determine a size of the reference area according to the parameter data, wherein the image generator includes:

a coordinate generator configured to determine a viewpoint coordinate corresponding to a sight of the user on the display area, based on the visual sensing data;

an image processor configured to identify the reference area on the display area, based on the determined viewpoint coordinate and the parameter data, and generate gain map data including gain values corresponding to the grayscales of the target area in the input image, based on the reference area; and a grayscale converter configured to generate the converted image from the input image, based on the gain values corresponding to the grayscales of the target area in the input image.

10. The display device of claim 9, wherein the grayscales of the target area in the converted image are lower than the grayscales of the target area in the input image.

11. The display device of claim 9, further comprising a memory device configured to store the parameter data.

12. A method of controlling a display panel including a lens unit and a display area disposed to overlap with the lens unit, the method comprising:

generating visual sensing data by sensing an eye of a user;

identifying a reference area on the display area, based on parameter data and the visual sensing data, and generating a converted image by adjusting grayscales of a target area adjacent to the reference area in an input image;

controlling the display panel, based on the converted image, wherein a size of the reference area is determined according to the parameter data;

determining a viewpoint coordinate corresponding to a sight of the user on the display area, based on the visual sensing data;

identifying the reference area on the display area, based on the determined viewpoint coordinate and the parameter data;

generating gain map data including gain values corresponding to the grayscales of the target area in the input image, based on the identified reference area; and generating the converted image from the input image, based on the gain values corresponding to the grayscales of the target area in the input image.

* * * * *